United States Patent
Waplington et al.

(10) Patent No.: US 12,073,106 B2
(45) Date of Patent: Aug. 27, 2024

(54) DATA RECORD CORRELATION AND MIGRATION

(71) Applicant: ServiceNow, Inc., Santa Clara, CA (US)

(72) Inventors: Brian James Waplington, San Diego, CA (US); Tamir Livneh, Petah Tika (IL); Hemendra Rana, Saratoga, CA (US); Saipraneeth Muddana, Swords (IE); Venkata Siva Sankar Alampalle, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/103,288

(22) Filed: Jan. 30, 2023

(65) Prior Publication Data
US 2024/0256168 A1    Aug. 1, 2024

(51) Int. Cl.
*G06F 3/06* (2006.01)

(52) U.S. Cl.
CPC .......... *G06F 3/0647* (2013.01); *G06F 3/0622* (2013.01); *G06F 3/067* (2013.01)

(58) Field of Classification Search
CPC ....... G06F 3/0647; G06F 3/0622; G06F 3/067
See application file for complete search history.

(56) References Cited

U.S. PATENT DOCUMENTS

| | | | |
|---|---|---|---|
| 11,360,699 B1 * | 6/2022 | Zhang | G06F 3/0619 |
| 2021/0064262 A1 * | 3/2021 | Myers | G06F 11/1466 |
| 2021/0096746 A1 * | 4/2021 | Narayanan | G06F 3/0619 |
| 2021/0303170 A1 * | 9/2021 | Lin | G06F 3/0647 |
| 2022/0358083 A1 | 11/2022 | Bhogle | |

* cited by examiner

*Primary Examiner* — Jason W Blust
(74) *Attorney, Agent, or Firm* — Van Pelt, Yi & James LLP

(57) ABSTRACT

A correlation request is received at a first application instance from a second application instance for a data record of the first application instance. A correlation index is updated with a directional correlation entry in response to a determination that the correlation request is approved. In response to determining that the data record has been modified, the updated correlation index is utilized to determine that the modified data record is to be provided for correlation to the second application instance. A version of the modified data record is provided to the second application instance.

20 Claims, 16 Drawing Sheets

1000

| | Requested Item | | | | Follow ▾ | Update | Delete |
|---|---|---|---|---|---|---|---|
| | RITM0010044 | | | | | | |

Number: RITM0010044  
Item: Remote Connectivity Request  
Request: REQ0010044  
Requested for: System Administrator  
Due date: 2022-10-18 04:28:22  
Configuration item:  
Watch list:

Opened: 2022-10-18 04:28:22  
Opened by: System Administrator  
Stage: request_approved  
State: Open  
Quantity: 1  
Estimated delivery:  
Backordered:  
Order Guide:

Variables

Tenant instance name  
diwali11

*Tenant application  
Lightstep Incident Response

*Requesting user  
System Administrator

*Tenant URL  
https://airworkergauat.service-now.com

*Tenant service user name  
nexus.e676ce1e1b221110e0950e95624bcb17

*Tenant service user password  
................                                              SHOW

*Enterprise URL  
https://nexuscontrollerr2.service-now.com

Additional request details  
tsst

FIG. 10

| Application Tenants | Name ▾ | Search | | | |
|---|---|---|---|---|---|
| All | | | | | |
| Request ID | | Status | Name ▲ | Application | Domain |
| Search | | Search | Search | Search | Search |
| a98f6a99870a95102fe 943f09bbb35ff | | Active | snowed | Lightstep Incident Response | Snowed - Parent/Snowed |
| 52c4b5d1878695102fe 943f09bbb35d9 | | Decommissioned | snowed | Lightstep Incident Response | Snowed - Parent/Snowed |
| 46aced15974ed5102764 fa98c253af71 | | Decommissioned | snowed | Lightstep Incident Response | Snowed - Parent/Snowed |
| 79e3f1d9974ed5102764 fa98c253af60 | | Decommissioned | snowed | Lightstep Incident Response | Snowed - Parent/Snowed |
| 4295561097ce15102764 fa98c253af42 | | Decommissioned | snowed | Lightstep Incident Response | Snowed - Parent/Snowed |
| 05b0315187869510 2fe943f09bbb355e | | Decommissioned | snowed | Lightstep Incident Response | Snowed - Parent/Snowed |

FIG. 11

| ⚙ Actions on selected rows... ⌄ | | Show Customization | | SQL Decoder |
|---|---|---|---|---|
| Rps remote system | Controller version | Outbound credential | Outbound user | Notes |
| Search | Search | Search | Search | Search |
| 839f22d997021910276458e7515dabb35b5 | 1.2.0 | 2f9f2ad9874a51107fa98c253af14.nexusco... | 839f22d997021910276464fa98c253af14.sync | 2022-09-19 11:59:40UTC: Upgraded 15 capa... |
| (empty) | 1.2.0 | (empty) | 8ce4f15d9974ed5102764fa98c253af72.sync | 2022-09-19 07:43:06UTC: Upgraded 15 capa... |
| (empty) | 1.2.0 | (empty) | ac0d6555974ed5102764fa98c253aff8.sync | 2022-09-19 07:09:00UTC: Upgraded 15 capa... |
| (empty) | 1.2.0 | (empty) | 0ff3b5d9974ed5102764fa98c253afa5.sync | 2022-09-19 07:39:11UTC: Upgraded 15 capa... |
| (empty) | 1.2.0 | (empty) | 5dc5de1097ce15102764fa98c253af9c.sync | 2022-09-16 07:33:54UTC: Upgraded 15 capa... |
| (empty) | 1.2.0 | (empty) | 64e07d19974ed5102764fa98c253afc3.sync | 2022-09-19 07:25:45UTC: Upgraded 15 capa... |
| | | | | 2022-09-16 |

FIG. 11 (CONTINUED)

| Local Correlation ID | Local Record | Local table | Remote correlation ID |
|---|---|---|---|
| Search | Search | Search | Search |
| 34b03839974259102764fa98c253aff0 | User: Abraham Lincoln | User [sys_user] | f0b03839974259102764fa98c253aff0 |
| eb40e9b9874ad512fe943f09bbb35fd | User: NexusTest user369 | User [sys_user] | ab40e9b9874ad512fe943f09bbb35fd |
| be6ad331974a59102764fa98c253af71 | User: wedg wedg | User [sys_user] | 7e6ad331974a59102764fa98c253af71 |
| 22670b25974e191027 64fa98c253af09 | User: SetB SetB | User [sys_user] | ee670b25974e191027 64fa98c253af08 |
| b21ccc2597461910 2764fa98c253afcc | Application Service: Data Demo ABC | Application Service [cmdb_ci_service_auto] | 721ccc2597461910 2764fa98c253afcc |
| 9df31ca99746191027 64fa98c253afdc | Application Service: NexusTestService994 | Application Service [cmdb_ci_service_auto] | 5df31ca99746191027 64fa98c253afdc |
| a02c0065974619102764fa98c253af24 | User: datag datag | User [sys_user] | 602c0065974619102764fa98c253af24 |
| 991917fd970a591027 64fa98c253af48 | User: wede wede | User [sys_user] | 591917fd970a591027 64fa98c253af48 |
| 76bad731974a591027 64fa98c253af2f | User: wedh wedh | User [sys_user] | 36bad731974a591027 64fa98c253af2f |
| 9c4613ad974e1910 2764fa98c253af0e | (empty) | Application Service [cmdb_ci_service_auto] | 5c4613ad974e1910 2764fa98c253af0e |
| d1374fed87c2d510 2fe943f09bbb358f | Application Service: 123 Test now A | Application Service [cmdb_ci_service_auto] | 91374fed87c2d51 02fe943f09bbb358f |
| d5dc4be5974e19102764fa98c253af99 | (empty) | Application Service [cmdb_ci_service_auto] | 95dc4be5974e19102764fa98c253af99 |
| cbd3de3d97465910 2764fa98c253af79 | User: Nexus User8 | User [sys_user] | 8bd3de3d97465910 2764fa98c253af79 |
| d5dc4be5974e19102764fa98c253af99 | Application Service: 123 Smal data a | Application Service [cmdb_ci_service_auto] | 95dc4be5974e19102764fa98c253af99 |

FIG. 12

| Actions on selected rows... ▾ | New | Show Customization | SQL Decoder |
|---|---|---|---|
| Remote System | State | Domain | |
| Search | Search | Search | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |
| 839f22d997021910 2764 fa98c253af14.nexusco... | Active | Snowed - Parent/Snowed | |

Capture Definition nexus_cmdb_ci_service

*You are editing a record in the Lightstep Team Bridge application (cancel)*

| * Process Event | nexus_cmdb_ci_service | Application | Lightstep Team Bridge |
|---|---|---|---|
| State | Inactive | Domain | global |
| * Order | 101 | | |

Trigger

* Source Table Name: Service [cmdb_ci_service]

Filter: Add Filter Condition | Add "OR" Clause

- Business criticality — changes — AND OR ✕
- or Short Description — changes — ✕
- or Managed by — changes — ✕
- or Managed By Group — changes — ✕
- or Name — changes — ✕
- or Owned by — changes — ✕
- or Support group — changes — ✕

Capture

* Include fields

Available:
- Aliases
- Approval group
- Asset
- Asset tag
- Assigned
- Assigned to
- Attestation Score
- Attested
- Attested By
- Attested Data Selected:
- Sys ID
- Business criticality
- Short Description
- Managed by
- Managed By Group
- Name
- Owned by
- Support group Include attachments ☐

[Update] [Delete]

1300

| Capture Definitions (5) | Outbound Flows (4) | Inbound Flows (4) | Process Events (8) | Remote Systems (1) |
|---|---|---|---|---|

1400 →

| ≡ | Outbound Flows | Search | Name | ▼ | Search | ◁◁ ◁ | 1 to 4 of 4 △ △△ |
|---|---|---|---|---|---|---|---|

⚑ Parent Definition = 179e776a87aadd102fe943f09bbb358d.diwali11 Sync

| ⚙ | ≡ Name ▲ | ≡ Remote System | ≡ Outbound Subflow | ≡ Domain |
|---|---|---|---|---|
| ☐ | nexus_cmdb_ci_service | 179e776a87aadd102fe943f09bbb358d.diwali11 | Sync Remote Service CI | global |
| ☐ | nexus_cmn_notif_device | 179e776a87aadd102fe943f09bbb358d.diwali11 | Outbound Notification Device Flow | global |
| ☐ | nexus_incident | 179e776a87aadd102fe943f09bbb358d.diwali11 | Outbound Sync Remote Incident | global |
| ☐ | nexus_sys_user_group | 179e776a87aadd102fe943f09bbb358d.diwali11 | Outbound Sync Remote Groups | global |

DATA RECORD CORRELATION AND MIGRATION

BACKGROUND OF THE INVENTION

Cloud-based solutions allow businesses to access services such as different business workflow and management services without requiring them to necessarily implement or host the services themselves. These services often rely on a variety of data sources including data provided by customers as well as third parties. By utilizing data sharing, a service can be provided with access to additional data sources, such as testing data sets, production data sets, third-party data sets, and proprietary customer data sets, among others. In certain configurations, data sharing enables data to be shared across different services as well as by different groups, where groups can correspond to different divisions within a company (such as Human Resources and Legal) or even different companies.

BRIEF DESCRIPTION OF THE DRAWINGS

Various embodiments of the invention are disclosed in the following detailed description and the accompanying drawings.

FIG. 10 is a diagram illustrating an embodiment of a user interface for viewing a correlation request.

FIG. 11 is a diagram illustrating an embodiment of a user interface for displaying target instances associated with correlation requests.

FIG. 12 is a diagram illustrating an embodiment of a user interface for displaying a correlation index used to capture portions of a correlation configuration.

FIG. 13 is a diagram illustrating an embodiment of a user interface for configuring a capture event associated with sharing a correlated data record.

FIG. 14 is a diagram illustrating an embodiment of a user interface for displaying outbound processing configurations associated with correlation requests.

DETAILED DESCRIPTION

Figure 1:
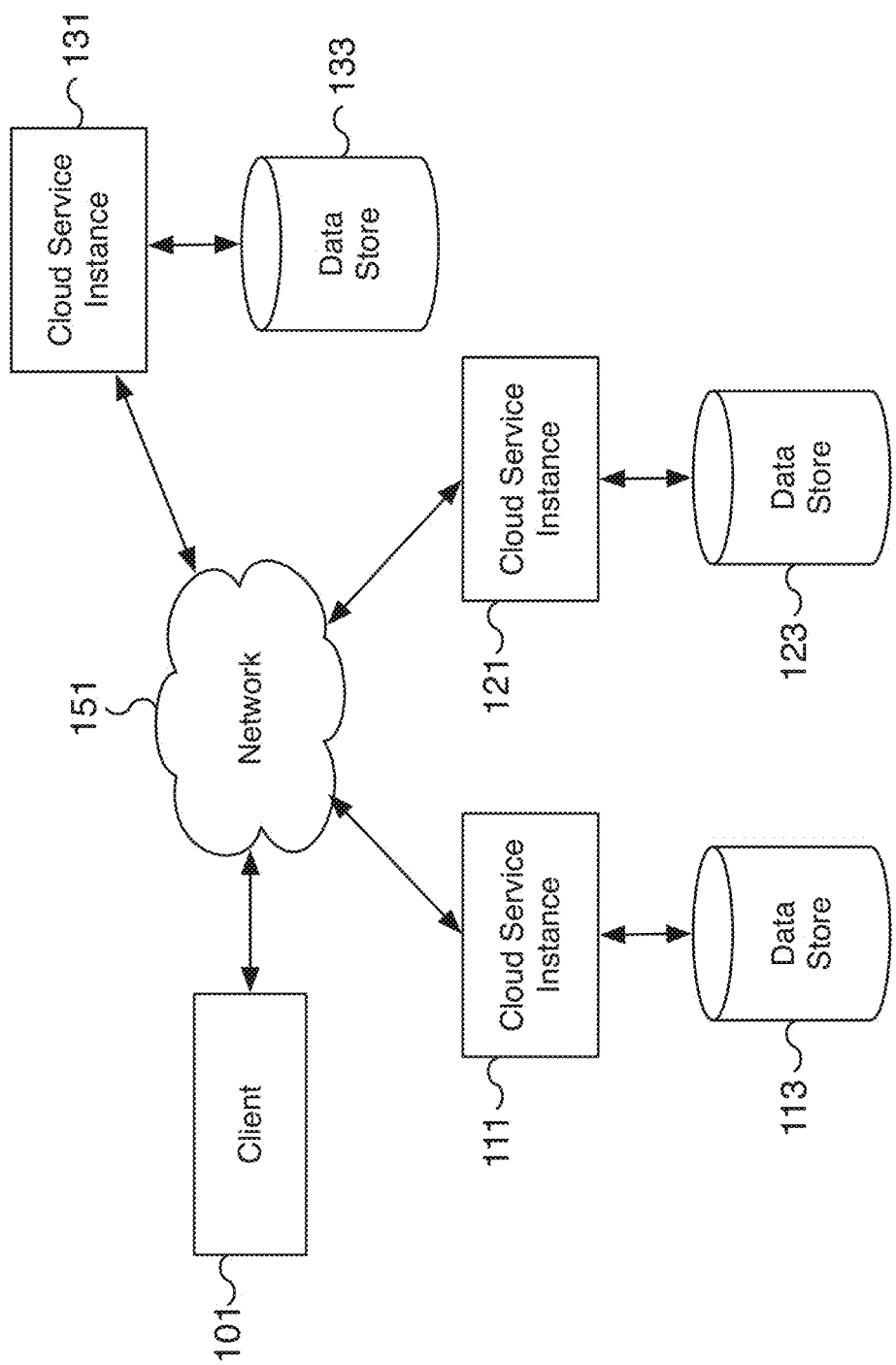
FIG. 1 is a block diagram illustrating an embodiment of a data record correlation and sharing system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Application-level data correlation and migration is disclosed. Using the disclosed techniques, data records can be correlated and shared across different cloud service instances by correlating data records between a source instance and a target instance. Moreover, the data record correlation and sharing can be configured as a cascading chain where a target instance can also function as a source instance with a second target instance. In various embodiments, the instances sharing data can exist on the same application server, such as under different application instances, or on different application servers that are remote from one another, such as on different network domains. In the disclosed embodiments, the data correlation is performed at the application layer and allows for data that is correlated to be modified on the fly as the data is being shared between instances. For example, the data correlation and sharing can be configured to share from the source instance only a subset of the fields of a data record to the target instance. Moreover, once the data is correlated, data transformation, supplementation, and/or enhancements along with other data processing steps can be performed at the source instance, target instance, or both instances.

In various embodiments, the data record correlation and sharing process performs inbound and/or outbound processing on correlated data records. For example, data records corresponding to company assets can be correlated and shared between a source and target application instance. When a shared asset data record is modified at the source application instance, the modified data record is identified and prior to providing a version of the data to the target application instance, outbound data processing on the modified data record is performed. In various embodiments, as part of the data record correlation and sharing process, a subset of the fields of the correlated asset data record can be shared and a subset of the fields can be excluded from sharing. For example, asset identifier, asset description, asset owner, and asset assigned location fields can be configured for sharing while asset owner home address and asset owner home phone number fields can be excluded. Moreover, as part of the outbound data processing, one or more records such as the asset assigned location field can be modified, for example, to remove potential personal identifying information before the relevant data fields are provided to the target instance. At the target instance, the data correlation and sharing processing can process all incoming data records and perform additional inbound data processing such as transformation, supplementation, enhancements, or other data processing. For example, an incoming correlated asset data record can have a value automatically assigned to its delegate owner field based on the values of the asset description and modified asset assigned location fields. Additionally, external sources can be accessed, such as via database, web, Internet, and/or API queries, to supplement the incoming data. For example, a list of the latest software updates for the asset referenced by the incoming asset data record can be retrieved and stored along with the modified version of the incoming asset data record at the target instance. Once inbound data processing at the target instance is complete for an incoming data record, in the event the modified data record is correlated to a second target instance, the data correlation and sharing process is repeated to provide the second target instance with a modified version of the correlated data record. In various embodiments, loops or cycles are detected during the data correlation and sharing process to prevent an endless loop of cascading updates. For example, updates can be tracked by using version numbers and/or by tracking the nodes and/or edges traveled during a correlated data record event update to prevent loops.

In various embodiments, the correlated data records between two instances can be migrated from an original target instance to a new (and potentially) different target instance. For example, a source application instance can be configured to approve the sharing of correlated data records with a first target application instance. In the event the first target instance is disabled or inactivated, the correlations between the source instance and first target instance are disabled and preserved for potential future migration. In various embodiments, the correlations are stored in a correlation index and the correlation index is updated when the first target instance is no longer reachable and/or the correlations have been disabled, for example, by an administrator. In the event the previously correlated records are to be migrated, for example, at the prompting of an administrator to migrate the correlations to a second target application instance, the correlation index is updated to assign the correlation of the appropriate data records to the second target instance. In some embodiments, the second target instance can be the first target instance, for example, in the event the first target instance is reenabled or reactivated. In some embodiments, the second target instance can be an application instance on the same application server as the source application instance or an application instance associated with a different application server, such as a remote application server connected via a network.

In some embodiments, as part of the migration process, once the data records of the source and new target application instances are correlated, the correlated data records are compared and records at the appropriate instance are updated. For example, based on the migration configuration, as part of the initial migration event, the source instance can update the target instance or, alternatively, the target instance can update the source instance depending on which instance is configured as the authoritative source during the migration event. In various embodiments, during the initial migration, particular migration configurations allow a target instance to update the source instance instead of vice versa. Once the migration is complete, based on the configuration of the original correlations, modifications to records at the source instance are used to update the target instance. In various embodiments, the updated correlations to the data records are reflected by directional correlation entries in a correlation index.

In some embodiments, a correlation request for a data record of a first application instance is received at the first application instance from a second application instance. For example, a second application instance such as a second cloud service instance requests to receive updates to a data record managed by the first application instance such as a first cloud service instance. In some embodiments, in response to a determination that the correlation request is approved, a correlation index is updated with a directional correlation entry. For example, an administrator of the first application instance can approve the correlation request. As another example, the access configurations and/or access rules installed and/or configured at the first application instance are used to approve the correlation request. Once the correlation request is approved, a directional correlation entry referencing the data record managed by the first application instance is inserted into a correlation index that is used to track correlated data records and their target instance(s). In some embodiments, the correlated data record of the first application instance may not (yet) exist at the first instance and the correlation established is between a potential data record of the first instance that meets correlation requirements. For example, the first and second application instances can be correlated prior to the existence of the correlated data record at the first instance and sharing can be automatically triggered once a version of correlated data record is created at the first instance.

In some embodiments, in response to determining that the data record has been modified, the updated correlation index is utilized to determine that the modified data record is to be provided for correlation to the second application instance. For example, once a data record tracked by the correlation index is modified (or created), a version of the modified data record is provided to the second application instance. In some embodiments, a new version of the modified data record is provided to the second application instance. For example, outbound data processing on the modified data record can be performed to create a new version of the modified data record that is provided to the second application instance. The modification can include filtering, modifying, supplementation, transforming, and/or other outbound data processing steps to create the new version of the modified data record for the second application instance. In some embodiments, the second application instance receives the version of the modified data record for storing at the second application instance. As part of the inbound data processing performed at the second application instance, the incoming data record can be further manipulated to create a new version of the data record provided by the first application instance for storing at the second application instance. In various embodiments, the correlation index of the second application instance is used to determine whether additional correlation and sharing processing for other target instances is required for the version of the modified record managed by the second application instance.

FIG. 1 is a block diagram illustrating an embodiment of a data record correlation and sharing system. In the example shown, clients such as client 101 access one or more cloud services hosted by cloud service instances 111, 121, and 131. In some embodiments, client 101 is an example administrative client used to manage data record correlation and sharing as well as the migration of configured data record correlations. In various embodiments, multiple clients such as client 101 exist to access and/or manage different cloud service instances, such as cloud service instances 111, 121, and 131. Cloud service instances 111, 121, and 131 each utilize a data store such as data stores 113, 123, and 133, respectively. Client 101 and each of cloud service instances 111, 121, and 131 are communicatively connected via network 151. Network 151 can be a public or private network. In some embodiments, network 151 is a public network such as the Internet. The services hosted by cloud service instances 111, 121, and/or 131 can be a variety of cloud-based services including services for managing digital workflows for enterprise operations and can rely on the ability to correlate and share data records between the different cloud instances. For example, cloud service instances 111, 121, and 131 correlate and share data records they each store on data stores 113, 123, and 133, respectively.

In some embodiments, client 101 is a network client for accessing and/or managing cloud services of cloud service instances 111, 121, and 131. For example, using a web browser client, client 101 can access web services hosted by cloud service instances 111, 121, and/or 131. In some embodiments, client 101 corresponds to a specific customer and/or account and each cloud service instance is associated with a specific customer and/or account. In some embodiments, client 101 is a desktop computer, a laptop, a mobile device, a tablet, a kiosk, a voice assistant, a wearable device, or another network computing device. In various embodiments, client 101 can also be used to manage the correlation and sharing of data records managed by a cloud instance, such as cloud service instances 111, 121, and 131. For example, client 101 can be used to configure data record correlation and sharing as well as the migration of correlation configurations between cloud service instances.

In some embodiments, cloud service instances 111, 121, and/or 131 are each an application instance that offers one or more application services such as cloud-based services. For example, each of cloud service instances 111, 121, and 131 can offer application services for managing and implementing digital workflows, including workflows for enterprise operations. In some embodiments, each instance represents an instance accessible by a particular entity, such as a user or corporate account. In some embodiments, each entity can correspond to a different company, customer, division within an organization, or another logical unit of separation. Although shown in FIG. 1 as separate components, one or more of cloud service instances 111, 121, and/or 131 can exist on and/or be implemented using the same computing instance. For example, in some embodiments, cloud service instances 111, 121, and/or 131 can be hosted by the same application server with logical boundaries to separate the difference instances. From the perspective of different user clients, their respective cloud service instances can appear to exist functionally on different computing systems.

In various embodiments, cloud service instances 111, 121, and/or 131 utilize data records to support the cloud-based services they offer. For example, each cloud instance can utilize data records, such as data records hosted by a data store or database, to support offered cloud services. In some embodiments, the data records can be correlated between different cloud instances such as between cloud service instances 111, 121, and/or 131. For example, an administrator of one cloud service instance can request the correlation of data records managed by another cloud service instance. If approved, modifications or updates to a correlated data record initiate a data record correlation and sharing process that allows the requesting cloud instance to receive a version of a correlated data record that has been modified. In various embodiments, the configured correlations can be further migrated from one cloud service instance to another. For example, correlations between a development instance can be migrated to a production instance. As another example, correlations between an instance of a first third-party vendor can be migrated to an instance of a second third-party vendor. In various embodiments, cloud service instances 111, 121, and/or 131 can each utilize a data correlation module (not shown in FIG. 1) to implement the correlation and sharing of data records as well as the migration of correlation configurations.

In some embodiments, cloud service instances 111, 121, and 131 utilize data stores 113, 123, and 133, respectively, for managing data including data records. For example, cloud service instances 111, 121, and 131 store and retrieve data records on data stores 113, 123, and 133, respectively. Unless specifically configured to correlate or share data records, data stores 113, 123, and 133 are only accessible by their respective cloud service instances. However, using the disclosed techniques, data records can be correlated and shared between different cloud service instances to allow the data records stored on their respective data stores to be correlated and shared between cloud instances. In various embodiments, the data correlation and sharing configurations for a cloud instance can be stored in a cloud instance's configured data store. For example, cloud service instances 111, 121, and 131 can utilize data stores 113, 123, and 133, respectively, for storing data record correlation and sharing configurations. In some embodiments, each of data store 113, 123, and/or 133 is implemented using one or more data stores such as one or more distributed data storage servers. For example, although shown as a single entity in FIG. 1, data store 113 can be implemented as one or more distributed data store components connected via network 151 to cloud service instance 111.

Although single instances of some components have been shown to simplify the diagram of FIG. 1, additional instances of any of the components shown in FIG. 1 may exist. For example, cloud service instances 111, 121, and/or 131 may include one or more servers and/or may share servers. Similarly, data stores 113, 123, and/or 133 may each include one or more data store servers. In some embodiments, data stores 113, 123, and/or 133 may not be directly connected to cloud service instances 111, 121, and 131, respectively. For example, data stores 113, 123, and/or 133 and their components may be replicated and/or distributed across multiple servers and/or components. In various embodiments, client 101 is just one example of a potential client to a cloud service instance. In some embodiments, components not shown in FIG. 1 may also exist.

Figure 2:
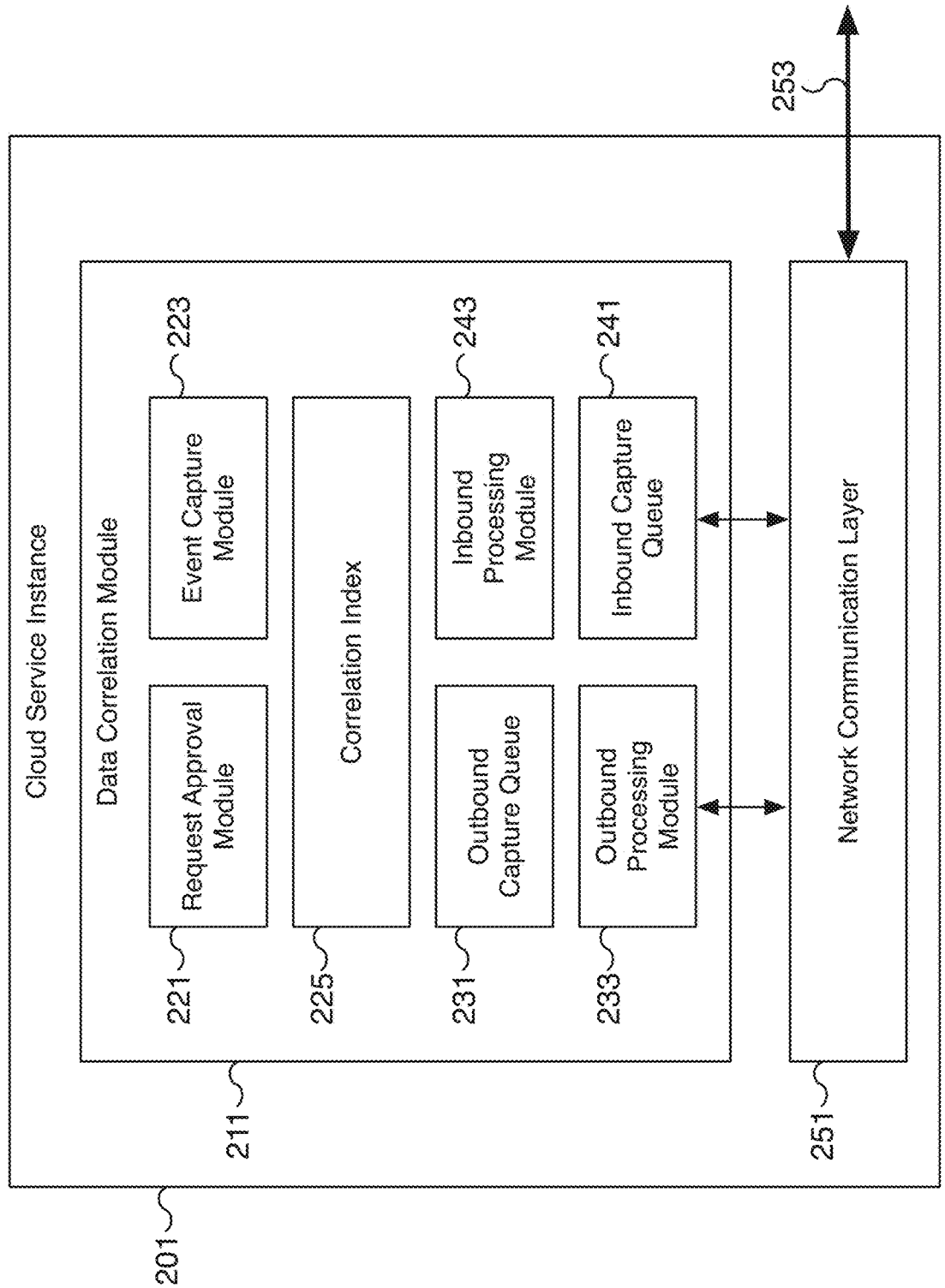
FIG. 2 is a block diagram illustrating an embodiment of a cloud service instance that supports data record correlation and sharing.

FIG. 2 is a block diagram illustrating an embodiment of a cloud service instance that supports data record correlation and sharing. In the example shown, cloud service instance 201 is an application instance that supports and implements cloud services such as application services for managing and implementing digital workflows, including workflows for enterprise operations. Although cloud service instance 201 includes many different components that are not shown, two components, data correlation module 211 and network communication layer 251, are shown. In various embodiments, these two components are utilized to support data record correlation and sharing. Data correlation module 211 is communicatively connected to network communication layer 251, and network communication layer 251 is connected to and/or interfaces with network connection 253. Cloud service instance 201 is communicatively connected to one or more networks such as the Internet via network connection 253 and, correspondingly, cloud service instance 201 is communicatively connected to other network components that are not shown. In some embodiments, cloud service instance 201 is an application instance such as cloud service instance 111, 121, and/or 131 of FIG. 1, network connection 253 is connected to network 151 of FIG. 1, and/or cloud service instance 201 utilizes and is communicatively connected to a data store such as data store 113, 123, or 133 of FIG. 1.

As shown in the example of FIG. 2, data correlation module 211 of cloud service instance 201 includes multiple components to support data record correlation and sharing including request approval module 221, event capture module 223, correlation index 225, outbound capture queue 231, outbound processing module 233, inbound processing module 243, and inbound capture queue 241. In various embodiments, fewer or more components of data correlation module 211 may exist and/or some of the components shown may be implemented as fewer or multiple components. In the example shown, request approval module 221 manages the approval of data correlation requests including data record correlation requests and migration requests. For example, a received or requested data record correlation request is managed by request approval module 221. Similarly, a received or requested data record correlation migration request is managed by request approval module 221. In some embodiments, a request is managed and tracked by both the party making the request and the party receiving the request. For example, the requesting party can track the status of a request including whether it was approved or denied. In contrast, the party receiving the request must first approve the request before the request is allowed. In some embodiments, the approval process is a manual process that requires human intervention, such as an authorized administrator to initiate and/or approve requests including data correlation and migration requests. In some embodiments, the approval process is an automated or semi-automated process. For example, requests can be approved based on configured access permissions and/or access privileges including granted sharing permissions/privileges that specify what accounts and/or cloud service instances are allowed access to certain data records and their fields.

In some embodiments, event capture module 223 is used to manage events related to correlated data records. For example, a data record that is modified may match a configured data record correlation configuration. This modification is identified and processed by the event capture module. For example, an event capture module monitors the modification of data records to identify records that have correlation configurations. Capture events are created for modified records that have a matching correlation configuration. In some embodiments, the modification required to trigger an event includes specific trigger event requirements. For example, the modification to the relevant data record must match configured event requirement triggers to create an event. In the event the trigger requirements are met, the created event can be used to process the modified data record for sharing. In various embodiments, once the event is captured, the event is processed using outbound capture queue 231. For example, captured events are inserted into outbound capture queue 231 where they can be processed within the resource limitations and requirements of cloud service instance 201.

In some embodiments, data record correlations are stored and managed via correlation index 225. For example, correlation index 225 is utilized to manage and track data records and their correlation and sharing requirements between different cloud service instances such as between different application instances. In some embodiments, correlation index 225 stores correlation identifiers used to uniquely identify a data record correlation configuration, the data record and database table that the correlation applies to, identifiers for the source and/or target cloud instance(s), and the status of the correlation configuration. In various embodiments, the status of a correlation configuration can be active or inactive. Other potential values for the status can include pending approval or requested, denied, pending migration, or another appropriate status. In some embodiments, each correlation configuration is a correlation entry stored in a correlation database table. Other parameters associated with a correlation configuration may be appropriate as well, such as a domain parameter, access credentials such as credentials required for sharing/accessing the data record, and a correlation history including a migration history for the data record. In some embodiments, correlation index 225 includes configurations for inbound and/or outbound processing to be performed on shared versions of the correlated data record.

In some embodiments, data correlation module 211 includes an outbound pipeline that includes at least the outbound components outbound capture queue 231 and outbound processing module 233. These outbound components are used for processing the correlation and sharing of output data records based on capture events corresponding to correlated data records that have been modified. Using outbound capture queue 231 and outbound processing module 233, a version of a modified correlated data record is provided to the target cloud service instance specified by a correlation configuration. For example, events stored in outbound capture queue 231 can be processed at the appropriate time, such as based on scheduling and/or resource availability, and removed from outbound capture queue 231. Once an event is removed from outbound capture queue 231, the event can be processed by outbound processing module 233 to perform any configured outbound processing steps. For example, outbound processing module 233 can be used to modify the correlated data record including by determining which fields of the correlated data record to share, modifying the values of certain fields of the data record, and/or supplementing the data record with additional information, such as additional fields. In some embodiments, outbound processing module 233 can retrieve additional information including from third-party sources to supplement the information provided by the correlated data record. Once the outbound processing step is complete, the processed version of the correlated data record is provided to the target cloud service instance. For example, the processed version of the data record can be packaged as part of an update and provided to network communication layer 251 to transport to the appropriate target cloud service instance via network connection 253.

In various embodiments, the inbound pipeline of data correlation module 211 for processing updated data records is similar to the outbound pipeline. In some embodiments, data correlation module 211 includes an inbound pipeline for receiving data record updates that includes at least the inbound components inbound capture queue 241 and inbound processing module 243. As updates are received via network connection 253 and forwarded by network communication layer 251 to data correlation module 211, the update events are stored in inbound capture queue 241. In various embodiments, inbound capture queue 241 can be used to throttle updates so that updates can be processed without overwhelming the resources of cloud service instance 201. For example, events stored in inbound capture queue 241 can be processed at the appropriate time, such as based on scheduling and/or resource availability, and removed from inbound capture queue 241. Once an event is removed from inbound capture queue 241, the event can be processed by inbound processing module 243 to perform any configured inbound processing steps. For example, inbound processing module 243 can be used to modify the received version of the correlated data record including by determining which fields of the received correlated data record to store, modifying the values of certain fields of the received data record, and/or supplementing the received data record with additional information, such as additional fields. In some embodiments, inbound processing module 243 can retrieve additional information including from third-party sources to supplement the information provided by the received correlated data record. Once the inbound processing step is complete, the processed version of the received correlated data record can be stored by cloud service instance 201, for example, in an associated data store. In some embodiments, the data record is written to an associated database of cloud service instance 201 via network communication layer 251 and network connection 253. In some embodiments, the inbound processing step may determine to not store the received correlated data record and/or determine to update other related records on the target instance instead of or in addition to the correlated data record. For example, inbound processing module 243 can determine that the correlated data record received does not match an entry in correlation index 225.

In some embodiments, network communication layer 251 is a network interface component for managing incoming and outgoing network communication. For example, outgoing versions of data records for sharing are provided by data correlation module 211 to network communication layer 251 for transport to a target cloud service instance via network connection 253. Similarly, updated versions of correlated data records received via network connection 253 are provided to data correlation module 211 by network communication layer 251. In some embodiments, network communication layer 251 may be utilized as an interface for retrieving and/or storing data records from an associated data store or database. For example, correlated data records identified for sharing can be retrieved from an associated database via network communication layer 251 and network connection 253. Similarly, received data records can be stored by a target cloud service instance to an associated database via network communication layer 251 and network connection 253.

Figure 3:
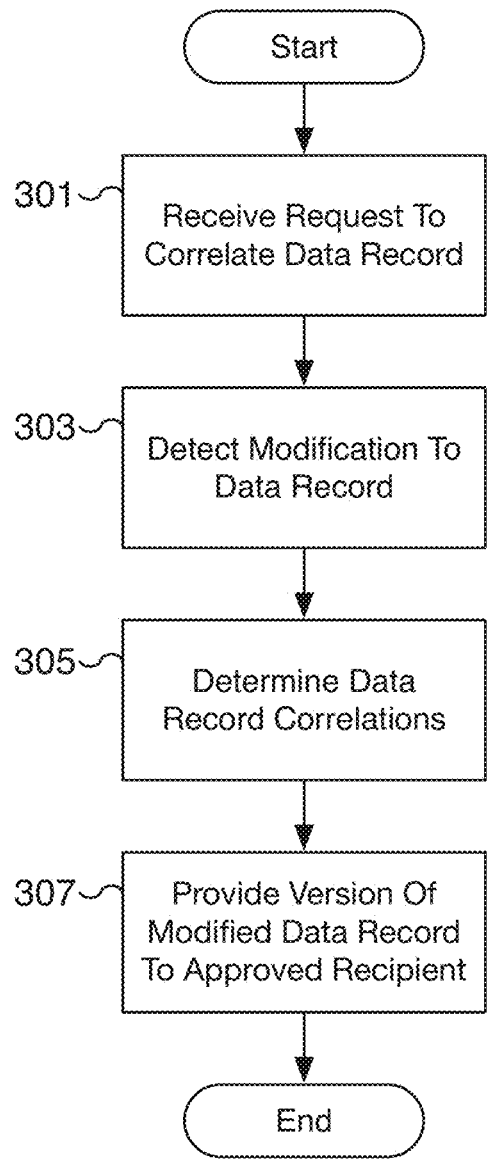
FIG. 3 is a flow chart illustrating an embodiment of a process for correlating and sharing a data record between cloud service instances.

FIG. 3 is a flow chart illustrating an embodiment of a process for correlating and sharing a data record between cloud service instances. For example, using the process of FIG. 3, a source cloud service instance can be configured to correlate and share one or more data records with a target cloud service instance. When the correlated data records at the source cloud service instance are modified, a version of the modified data records are shared with the target cloud service instance. In various embodiments, the correlation configuration is managed by a data correlation module on the source and/or target cloud service instance. For example, both the source and target instances can track data record correlations using their respective data correlation modules including their respective correlation indices. In some embodiments, the process of FIG. 3 is performed at a source cloud service instance in response to a correlation request from a target cloud service instance. Although the process of FIG. 3 describes the correlation of a single data record, the process can be applied to the correlation and sharing of multiple or groups of data records. In some embodiments, the source and target cloud service instances are different application instances among cloud service instances 111, 121, and 131 of FIG. 1. In some embodiments, the correlated data records are stored in a data store associated with the source cloud service instance such as data store 113, 123, or 133 of FIG. 1. In some embodiments, the data correlation module used to manage the correlation configurations is data correlation module 211 of FIG. 2.

At 301, a request to correlate a data record is received. For example, a data record correlation request is received at the source cloud service instance. In some embodiments, the request is initiated by a target cloud service instance. For example, an administrator of the target cloud service instance can configure and send a correlation request for a data record to the source cloud service instance. In various embodiments, the correlation request specifies a data record of the source cloud service instance. In some embodiments, the request includes an identifier of the requester (e.g., the target cloud service instance) and an identifier used by the target instance to reference the correlation request. In some embodiments, the request can include access credentials to the target cloud service instance. For example, provided access credentials in the request can be used by the target cloud service instance to authenticate and/or authorize a version of the data record provided by the source cloud service instance. In some embodiments, the correlation request is a migration request. For example, a migration request involves migrating previously correlated data records from a different target cloud service instance to now point from the source cloud service instance to the target cloud service instance requesting the migration. In some embodiments, the requested correlated data record of the source cloud service instance may not (yet) exist at the source cloud service and the correlation requested is based on a potential data record of the source instance that meets correlation requirements. For example, if a correlation request is approved, the source and target application instances can be correlated prior to the existence or creation of the correlated data record at the source cloud service instance.

In various embodiments, the correlation request is reviewed and if approved, a correlation configuration is created for the requested data record. Once the correlation configuration is created, modifications to the correlated data record can be monitored to detect changes or updates to the data record. Any updates to the data record, including the creation or deletion of the data record matching correlation requirements, can result in sharing a version of the modified data record with the target cloud service instance. In some embodiments, the initial approval of a correlation request triggers a detected modification and results in providing a version of the data record to the target cloud service instance.

At 303, a modification to the data record is detected. For example, a change to a data record is detected by a data record monitoring service. In various embodiments, any changes to data records at the source cloud service instance are detected. The changes can include any updates to any fields of any data records as well as the creation or deletion of data records. In some embodiments, only a subset of data records may be monitored and the ability to correlate data across cloud service instances is limited to the data records that can be monitored.

At 305, data record correlations are determined. For example, the change to the data record detected at 303 is compared to configured correlations. In the event the change matches a configured correlation, the data record change triggers updating the relevant target cloud service instances. In some embodiments, the update reflects the deletion of the correlated data record at the source instance. In various embodiments, a set of one or more trigger event requirements can be configured that must be met in order to trigger sharing the data record. For example, a data record can be configured to only update a particular target cloud service instance in the event particular trigger event requirements are met, such as a particular field of the data record is updated, the update is performed by a particular user, and the update is performed within a certain window of time. Based on the configured requirements, simply updating a field of a correlated data record may not meet the configured requirements for sharing the data record. In the event the configured sharing requirements are met, the data record is marked for sharing to the appropriate target cloud instances. In some embodiments, a correlation index is utilized to determine the appropriate data record correlations including an approved target cloud service instance.

At 307, a version of the modified data record is provided to an approved recipient. For example, a version of the data record with a modification detected at 303 and with correlations determined at 305 is provided to an approved target cloud service instance. In some embodiments, a modified data record is provided only after an outbound processing step is performed to create a new version of the data record. The new version of the data record shared with one or more target instances can include modified values for the data record fields as well as fewer or more fields. For example, some fields may be removed from the data record before it is shared and additional fields can be added and populated in the shared version of the data record. Using the correlation results determined at 305, an approved cloud service instance is provided with the new version of the data record.

Figure 4:
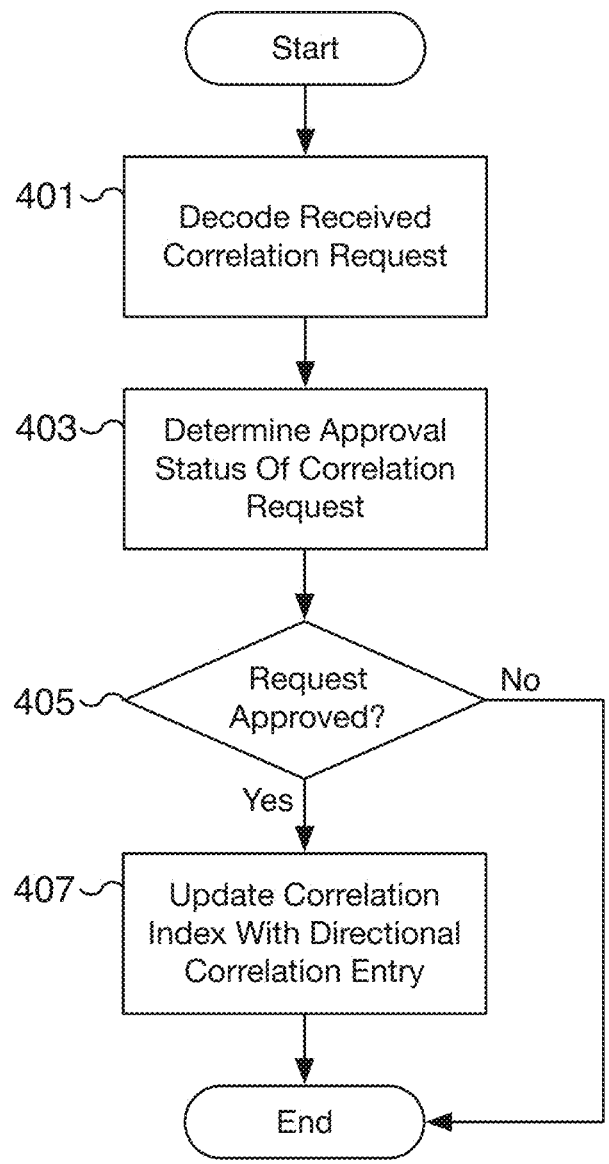
FIG. 4 is a flow chart illustrating an embodiment of a process for processing a request to correlate and share data records between cloud service instances.

FIG. 4 is a flow chart illustrating an embodiment of a process for processing a request to correlate and share data records between cloud service instances. For example, using the process of FIG. 4, a source cloud service instance processes a received correlation request from a target cloud service instance. In the event the request is approved, a correlation configuration is created that allows the target instance to receive updates to the correlated data record. In some embodiments, the process of FIG. 4 is performed at 301 of FIG. 3. In some embodiments, the source and target cloud service instances are different application instances among cloud service instances 111, 121, and 131 of FIG. 1. In some embodiments, the correlated data records are stored in a data store associated with the source cloud service instance such as data store 113, 123, or 133 of FIG. 1. In some embodiments, the data correlation module used to manage the correlation configurations is data correlation module 211 of FIG. 2.

At 401, a received correlation request for a data record is decoded. For example, a correlation request is received and decoded to determine the request parameters. In various embodiments, the data record requested for correlation and its associated database table are decoded and identified. For example, once the requested data record and table are identified, the request can be matched to an existing database table and potential data record, if one exists. In some embodiments, the requested correlated data record may not (yet) exist at the source cloud service and the correlation requested is between a potential data record of the source instance that meets correlation requirements. In some embodiments, additional information is decoded from the correlation request such as the target cloud service instance requesting the correlation among other parameters of the request. In some embodiments, the request includes access or authorization credentials. For example, a request can provide access credentials such as an access token to help validate messages from the source instance to the target instance or from the target instance to the source instance.

At 403, the approval status of the correlation request is determined. For example, once the correlation request is decoded, the correlation request is either approved or denied. The determination of whether to approve or deny the request determines the approval status of the request. In some embodiments, the approval of a correlation request is provided by an administrator of the source cloud service instance. For example, the administrator is provided with a prompt requesting that the correlation request is either approved or denied. In particular embodiments, the prompt can include information describing the correlation request such as the table associated with the requested data record, a description of the data record, parameters of the correlation request, and the target instance requesting the correlation. In some embodiments, the approval is automated or semi-automated based on configured approval rules. For example, approval rules can be configured that allow certain target instances access to certain database tables and records. The configured access permissions can be applied to approve or deny the correlation request. In various embodiments, the approval status corresponds to whether the correlation request is approved.

At 405, a determination is made whether the request is approved. In the event the request is approved, processing proceeds to 407. In the event the request is not approved, processing completes. Although not shown in FIG. 4, in some embodiments, in the event the request is not approved or is denied, a denial response is provided to the requesting cloud service instance informing the instance of the denial.

At 407, a correlation index is updated with a directional correlation entry. For example, a correlation index of a data correlation module of the cloud service instance is updated to reflect the approved data record correlation request. In various embodiments, a directional correlation entry is inserted into the correlation index and references two application instances such as pointing from the source cloud service instance to the target cloud service instance. In some embodiments, the correlation entry includes a unique correlation identifier for the data record correlation, an identifier for the correlated data record, an identifier for the table of the correlated data record, a unique identifier for the corresponding correlation entry stored at the target instance, an identifier or reference for the target instance, a state of the correlation entry, and a domain associated with the correlation entry. In some embodiments, the correlation entry can include additional correlation configuration information including outbound processing steps to perform when the data record is to be shared, requirements that must be met to trigger sharing the data record, and access credentials, among other correlation configuration information. For example, the correlation entry can be updated with access credentials associated with the correlation entry and the target instance that can be used to provide updates to the target instance when the data record approved for correlation is modified. In some embodiments, a response is provided to the requesting cloud service instance informing the instance of the approved correlation request.

Figure 5:
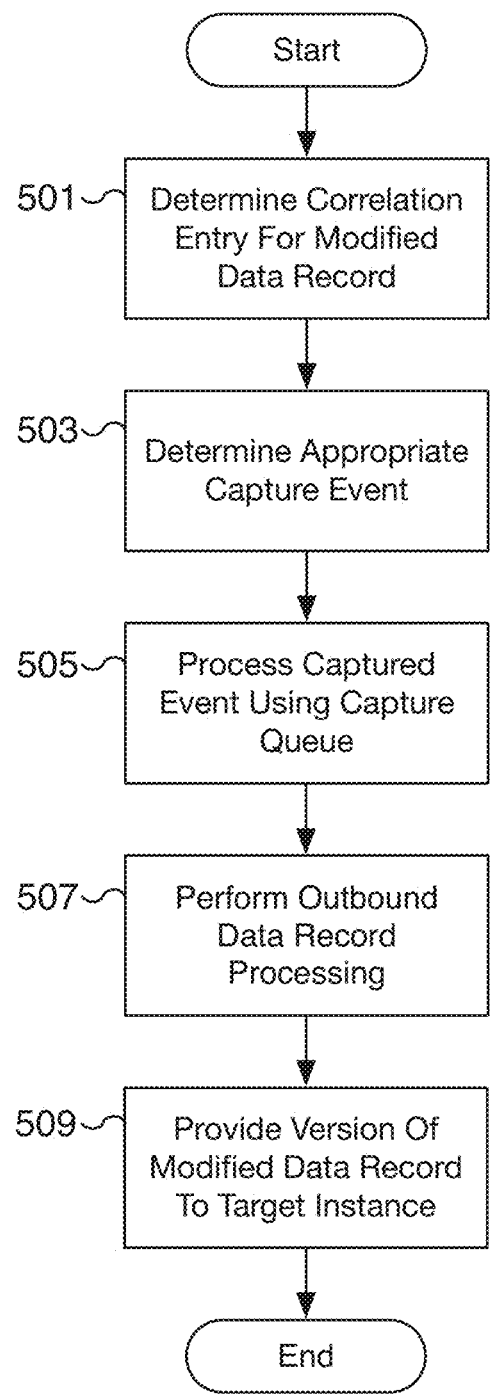
FIG. 5 is a flow chart illustrating an embodiment of a process for sharing a correlated data record between cloud service instances.

FIG. 5 is a flow chart illustrating an embodiment of a process for sharing a correlated data record between cloud service instances. For example, using the process of FIG. 5, a version of a modified data record is shared between a source cloud service instance and a target cloud service instance. In various embodiments, the process of FIG. 5 is performed by the source cloud service or application instance in response to detecting a modification to a correlated data record. Depending on correlation configurations, a target cloud service instance receiving updated data of a correlated data record can also function as a source cloud service instance for a different target cloud service. For example, data record correlations can form cascading chains where the modification of a data record at an upstream cloud service instance triggers modifications along a chain of downstream cloud service instances as each instance in the chain is updated and in turn updates the next dependent instance.

In some embodiments, a data correlation module of the source cloud instance such as data correlation module 211 of cloud service instance 201 of FIG. 2 is used in the process of FIG. 5 to process the correlation and sharing of the correlated data record. For example, a correlation index such as correlation index 225 of FIG. 2 can be used to identify a modified data record with a correlation configuration or correlation entry. A capture event can then be identified and created using event capture module 223 of FIG. 2 and an outbound event can be inserted into outbound capture queue 231. When the event is processed, outbound processing module 233 can perform outbound processing steps to prepare the version of the modified data record for sharing with the approved target cloud service instance. In some embodiments, the process of FIG. 5 is performed at 303, 305, and/or 307 of FIG. 3. In some embodiments, the source and target cloud service instances are different application instances among cloud service instances 111, 121, and 131 of FIG. 1. In some embodiments, the correlated data records are stored in a data store associated with the source cloud service instance such as data store 113, 123, or 133 of FIG. 1.

At 501, a correlation entry for a modified data record is determined. For example, a correlation index is used to identify a directional correlation entry for the modified data record based on the data record and its database table. In some embodiments, the directional correlation entry includes resolution information including the associated target and source application or cloud service instances. In some embodiments, the directional correlation entry is used at least in part to determine that the detected modification does not create an unnecessary loop. For example, the directional correlation entry can include version information to determine whether this version of the update was previously processed. As another example, by tracking traveled edges between a graph of cloud service instances, a directional correlation entry can be used to determine whether the update has been previously seen by this cloud service instance. Although the detection of a loop can be performed at step 501, in some embodiments, the loop detection and prevention actions are performed at a different step when processing the correlation and sharing of a data record.

At 503, the appropriate capture event is determined. For example, using the correlation configuration associated with the modified data record, an appropriate capture event is determined. In various embodiments, a correlated data record is only shared in the event the configuration requirements for sharing are met. These requirements are met when an event meeting the requirements is met. For example, a data record can be configured to only update a particular target cloud service instance in the event a particular field of the data record is updated, the update is performed by a particular user, and the update is performed within a certain window of time. Based on the requirements configured, simply updating a field of a correlated data record may not meet the configured requirements for sharing the data record. In various embodiments, an appropriate capture event is identified only when the configured sharing requirements are met.

At 505, the capture event is processed using a capture queue. For example, the capture event is inserted in an outbound capture queue and dequeued when the cloud service instance is available to process the event. In various embodiments, a capture queue is utilized to throttle the sharing of correlated data records at the source instance until the appropriate resources are available to process pending captured events. In various embodiments, the capture queue allows the source cloud instance to effectively manage the sharing of correlated data records.

At 507, outbound data record processing is performed. For example, one or more processing steps are performed to modify the data record to create a version appropriate for sharing. In some embodiments, the result is the creation of a new version of the modified data record. For example, one or more fields of the data record can be removed, for example, to prevent the sharing of confidential, irrelevant, or unwanted information. Similarly, one or more fields can be added to supplement the data record with additional information. In some embodiments, the existing fields can be further modified, for example, to convert the values in the field into an appropriate value or format for the target cloud service instance. In some embodiments, one or more data sources including external data sources can be queried as part of the outbound processing step. For example, a web query can be performed to retrieve information to modify an existing and/or populate a new field of the data record as part of the outbound processing performed at 507.

At 509, a version of the modified data record is provided to the target cloud service instance. For example, the version of the modified data record created at 507 is packaged and provided to the target cloud service instance identified by the correlation entry determined at 501. In some embodiments, the data record update is provided along with access credentials such as an access token to improve the security aspects associated with the transfer of record data between cloud service instances. In some embodiments, once the provided version of the modified data record is received at a target cloud service instance, the received data is further processed before it is stored at a data store of the target instance. In some scenarios, the provided data record update triggers cascading updates based on correlations at the target cloud service instance. In some embodiments, loops are prevented at the inbound pipeline of the target cloud service instance. For example, the version of the modified data record provided at 509 can include a version number used to detect duplicate or recursive updates.

Figure 6:
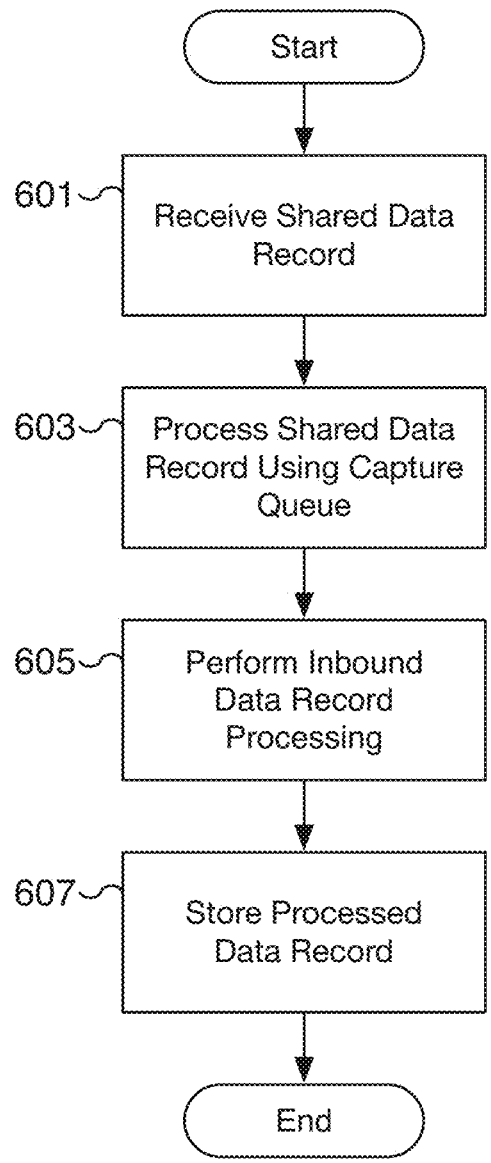
FIG. 6 is a flow chart illustrating an embodiment of a process for processing the receipt of an updated correlated data record provided by a source cloud service instance.

FIG. 6 is a flow chart illustrating an embodiment of a process for processing the receipt of an updated correlated data record provided by a source cloud service instance. For example, using the process of FIG. 6, a version of a shared modified data record provided by a source cloud service instance is received at a target cloud service instance. In various embodiments, the process of FIG. 6 is performed by the target cloud service instance in response to receiving the updated correlated data record. Depending on correlation configurations, the target cloud service instance can modify the received data record during its inbound pipeline and store a new modified version in an associated data store. In some embodiments, the data record update by the target cloud service instance can trigger an additional downstream update in the event the updated data record is correlated to a different target cloud service.

In some embodiments, a data correlation module of the target cloud instance such as data correlation module 211 of cloud service instance 201 of FIG. 2 is used in the process of FIG. 6 to process the sharing of the received correlated and shared data record. For example, a correlation index such as correlation index 225 of FIG. 2 can be used to identify a correlated and shared data record with a correlation configuration or correlation entry. The received data record associated with a capture event using event capture module 223 of FIG. 2 and an inbound event can be inserted into inbound capture queue 241. When the event is processed, inbound processing module 243 can perform inbound processing steps to prepare a version of the shared data record that is stored in an associated data store of the target cloud service instance. In some embodiments, the process of FIG. 6 is performed at 307 of FIG. 3. In some embodiments, the source and target cloud service instances are different application instances among cloud service instances 111, 121, and 131 of FIG. 1. In some embodiments, the correlated data records are stored in a data store associated with the target cloud service instance such as data store 113, 123, or 133 of FIG. 1.

At 601, a shared data record is received. For example, a source cloud service instance provides a data record to share with the target instance. In various embodiments, the shared data record is a version of a correlated data record that has been recently modified. Based on the modification to the correlated data record, the target instance is now receiving a version of the modified data record prepared by the source instance. In some embodiments, a correlation entry is identified in a correlation index to confirm the received data record matches an approved correlation configuration. For example, the source instance and data record and/or received metadata can be matched to identify a corresponding correlation entry. In some embodiments, an event capture module is further used to match the incoming data record to an update event. For example, properties of the data record update can be used to match a configured update event including update requirements for updating the version of the data record stored at the target cloud service instance.

In some embodiments, loops between instances are prevented at the inbound pipeline of the target cloud service instance. For example, the shared data record received at 601 can include a version number used to detect duplicate or recursive updates. In the event the update causes a loop, the received data record does not need to be processed and the version of the data record managed by the target instance is not updated.

At 603, the shared data record is processed using a capture queue. For example, the received data record can trigger the detection of an update event and the event is captured as a captured event. For example, each received shared data record can be processed as a captured event using a capture queue. In some embodiments, the capture event is inserted in an inbound capture queue and dequeued when the cloud service instance is available to process the event. In various embodiments, a capture queue is utilized to throttle the sharing of correlated data records at the target instance until the appropriate resources are available to process pending captured events. In various embodiments, the capture queue allows the target cloud instance to effectively manage the sharing of correlated data records.

At 605, inbound data record processing is performed. For example, one or more processing steps are performed to modify the received data record to create a version for the target cloud service instance. In some embodiments, the result is the creation of a new version of the received shared data record. For example, one or more fields of the data record can be removed, for example, to filter confidential, irrelevant, or unwanted information. Similarly, one or more fields can be added to supplement the received data record with additional information. In some embodiments, the existing fields can be further modified, for example, to convert the values in the field into an appropriate value or format for the target cloud service instance. In some embodiments, one or more data sources including external data sources can be queried as part of the inbound processing step. For example, a web query can be performed to retrieve information to modify an existing and/or populate a new field of the received data record as part of the inbound processing performed at 605.

In some embodiments, the inbound processing step may determine to not store the received correlated data record and/or determine to update other related records on the target instance instead of or in addition to the correlated data record. For example, inbound processing module 243 can determine that the correlated data record received does not match an entry in correlation index and the correlated data record is not stored at 607. In some embodiments, the inbound processing step may result in updating, including deleting or deactivating, multiple data records managed by the target instance. In the event additional data records are processed by the inbound processing step of 605, the modified records can be similarly stored at step 607, if appropriate.

At 607, the processed data record is stored. For example, the version of the shared correlated data record received at 601 is stored by target cloud service instance at a data store associated with the target instance. In various embodiments, a version of the revised data record updated by the inbound processing performed at 605 is stored along any other processed data records impacted by the determined correlation. In particular embodiments, the updated changes are also reflected in the correlation index. For example, in some embodiments, the correlation index of a data correlation module is updated to track which version of the data record is stored, allowing the instance to prevent duplicate or recursive updates. In some embodiments, the list of travelled instances associated with the data record update is maintained to track previously updated cloud service instances as another or additional technique to prevent duplicate or recursive updates.

In some embodiments, the storing of the processed data record triggers the detection of modifications to a correlated data record. For example, in the event the processed data record is correlated as a source for a different target instance, the step of storing the processed data record can trigger updating downstream target instances. In various embodiments, the downstream target instances are updated using the processes of FIGS. 3, 4, and/or 5.

Figure 7:
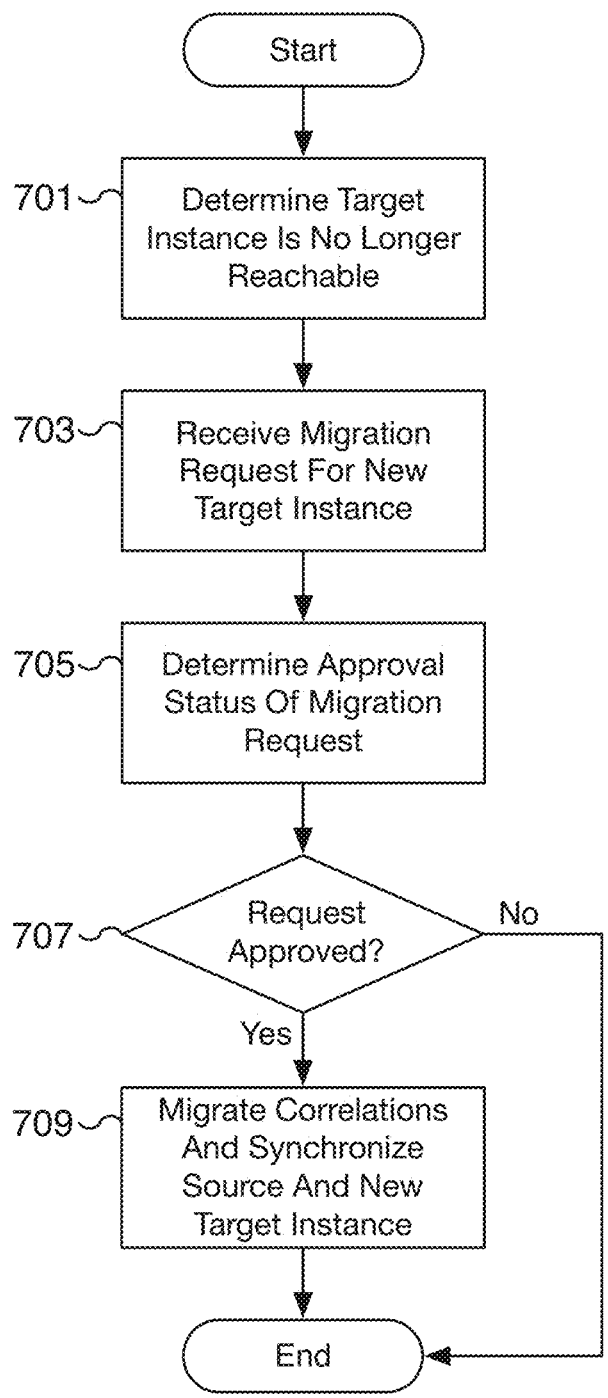
FIG. 7 is a flow chart illustrating an embodiment of a process for migrating correlation configurations between cloud service instances.

FIG. 7 is a flow chart illustrating an embodiment of a process for migrating correlation configurations between cloud service instances. For example, using the process of FIG. 7, data record correlation configurations approved between a first source cloud service instance and a first target cloud service instance can be migrated such that the correlations now bind between the first source cloud service and a second target cloud service. In various embodiments, the process of FIG. 7 is performed by the source cloud service instance in response to detecting that the first target cloud service instance is deactivated or no longer reachable and further in response to receiving a migration request from the second target cloud service instance. In some embodiments, the process of FIG. 7 is performed at 301 of FIG. 3. In some embodiments, the first source, first target, and second target cloud service instances are different application instances among cloud service instances 111, 121, and 131 of FIG. 1. In some embodiments, the correlated data records are stored in a data store associated with the source cloud service instance such as data store 113, 123, or 133 of FIG. 1.

At 701, a determination is made that the target instance is no longer reachable. For example, the target instance of a correlation configuration may be deactivated and/or disabled and may be no longer reachable from the source instance. The source instance detects that the target instance is no longer available for sharing correlated data records and disables the sharing of correlated data records with the target instance. In various embodiments, the correlation index at the source instance is updated for the correlation entries that point to the unreachable target instance. Once the appropriate correlation entries are disabled, updates to the correlated data records will not result in updating the unreachable target instance. Although data record updates are no longer provided to the unreachable target instance, the configuration for the previously approved correlated data records is not deleted from the correlation index but is instead only disabled. In various embodiments, each correlation entry includes a history and/or log of changes allowing administrators to track the status and changes to the entry over time.

In some embodiments, the step of 701 is optional and a migration request can be processed without first detecting that the original target instance is unreachable. In various embodiments, the deactivation of the corresponding correlation entries can instead be initiated by an administrator such as an administrator of the source and/or target instances. For example, a target instance can provide a request to disable data record correlation to the source instance. As another example, an administrator of the source instance can disable correlation with the target instance regardless of whether the target instance is active, reachable, and/or agrees to disable correlation.

At 703, a migration request is received for the new target instance. For example, a request to migrate the configured correlations from the previous target instance to a new target instance is received. In some embodiments, the migration request is provided by the new target instance. Alternatively, the migration request can be provided at the source instance, such as by an administrator of the source instance. In some embodiments, the migration request is provided by the old target instance. In some embodiments, the migration request is automated or semi-automated. For example, the migration request can be automatically initiated by one or more failover configurations.

In various embodiments, the migration request is a type of correlation request and specifies at least the data records for correlation and the new target instance, among other migration parameters. In some embodiments, the migration request includes access credentials, an identifier of the database tables of the correlated data records, one or more correlation entry identifiers, and/or an identifier of the old target instance.

At 705, the approval state of the migration request is determined. For example, once the migration request is received, the request is either approved or denied. The determination of whether to approve or deny the request determines the approval state of the request. In some embodiments, the approval of a migration request is provided by an administrator of the source cloud service instance. For example, the administrator is provided with a prompt requesting that the migration request is either approved or denied. In particular embodiments, the prompt can include information describing the migration request such as the database tables associated with the correlated data records, descriptions of the correlated data records, parameters of the migration request, and the new and/or old target instances involved in the migration. In some embodiments, the approval is automated or semi-automated based on configured approval rules. For example, approval rules can be configured that allow certain target instances access to certain database tables and records. The configured access permissions can be applied to approve or deny the migration request. In some embodiments, approval and migration rules can also be configured to automatically initiate and approve a migration request based on an event, such as a detected failure or a scheduled migration event. In various embodiments, the approval state is based on whether the migration request is approved.

At 707, a determination is made whether the request is approved. In the event the request is approved, processing proceeds to 709. In the event the request is not approved, processing completes and the migration is not performed. Although not shown in FIG. 7, in some embodiments, in the event the request is not approved or is denied, a denial response is provided to the requesting cloud service instance informing the instance of the denial.

At 709, the relevant correlation configurations are migrated and the source and new target instance are synchronized. For example, the approved migration results in migrating the correlation configuration from using the old target instance to using the new target instance and synchronizing the newly correlated data records. In some embodiments, as part of the migration process, once the data records of the source and new target application instances are correlated, the correlated data records are compared and records at the appropriate instance are updated. For example, based on the migration configuration, as part of performing the initial migration, the source instance can update the target instance or, alternatively, the target instance can update the source instance depending on which instance is configured as the authoritative source during the migration event. In various embodiments, during the initial migration, particular migration configurations allow a target instance to update the source instance instead of vice versa. Once the migration is complete, based on the configuration of the original correlations, modifications to records at the source instance are used to update the target instance. In various embodiments, the updated correlations to the data records are reflected by directional correlation entries in a correlation index.

Figure 8:
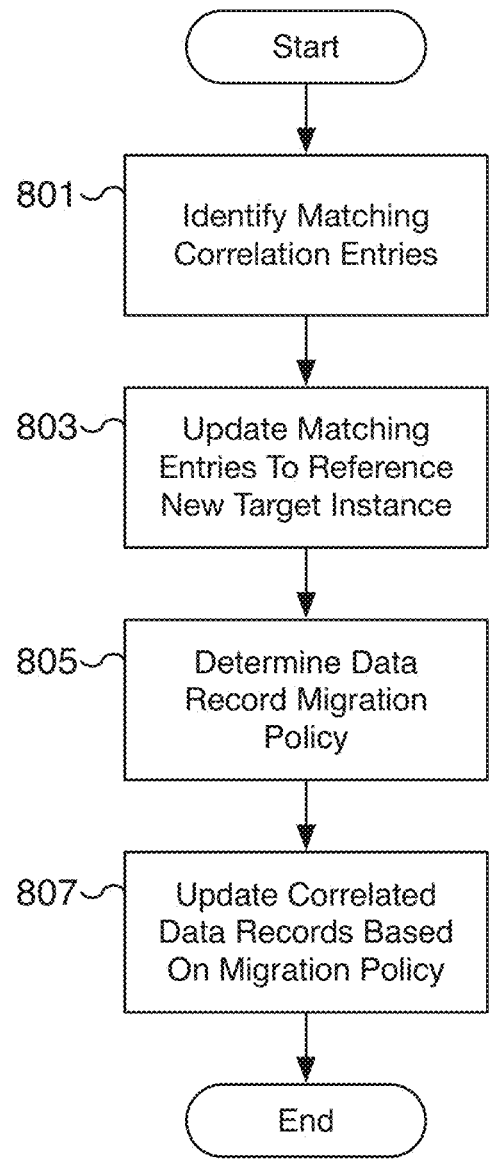
FIG. 8 is a flow chart illustrating an embodiment of a process for migrating correlation configurations to a new target cloud service instance.

FIG. 8 is a flow chart illustrating an embodiment of a process for migrating correlation configurations to a new target cloud service instance. For example, using the process of FIG. 8, a source cloud service instance processes an approved migration request by updating a correlation index to identify and migrate the appropriate configured correlations from an old target instance to a new target instance. In various embodiments, the correlation indices of the source and target instances are both updated to reflect the migration.

In some embodiments, the process of FIG. 8 is performed at 709 of FIG. 7. In some embodiments, the source, old target, and new target cloud service instances are different application instances among cloud service instances 111, 121, and 131 of FIG. 1. In some embodiments, the correlated data records are stored in a data store associated with the source cloud service instance such as data store 113, 123, or 133 of FIG. 1. In some embodiments, the data correlation module used to manage the migration is data correlation module 211 of FIG. 2.

At 801, matching correlation entries are identified. For example, correlation entries that match the migration parameters of the approved migration request are identified. In some embodiments, the matching is based on identifying correlation entries that point to the old target cloud service instance and further match the correlation requirements of the new target cloud service instance. For example, the migration request may request that only a subset of the configured correlations pointing to the old target instance are migrated, such as only data records belonging to certain database tables. In various embodiments, at 801, only the correlation entries of the correlation index that meet the migration requirements are identified for migration.

At 803, the matching correlation entries are updated to reference the new target instance. For example, for each of the correlation entries identified at 801, each matching correlation entry is updated to point to the new target cloud service instance. In some embodiments, the directional correlation entry is updated with an identifier of the new target application instance. In various embodiments, the update is logged and added to the history saved for the correlation entry. For example, when the correlation entry and/or the correlation index is updated, the changes are tracked and logged to preserve the modification history. In various embodiments, tracking the history of changes allows an administrator to review the changes and for migration and correlation updates to be reverted.

At 805, the data record migration policy is determined. In some embodiments, as part of the initial migration event, once the data records are correlated between the source instance and new target instance, the correlated data records are compared and records at the appropriate instance are updated. For example, based on the configured migration policy, as part of performing the initial migration, the source instance can update the target instance or, alternatively, the target instance can update the source instance depending on which instance is configured as the authoritative source during the migration event. At 805, the migration policy including which instance is the authoritative source during migration is determined. In some embodiments, the authoritative source can be determined at the data record, database table, and/or at another level of granularity. For example, some database tables can utilize the source instance as the authoritative source during migration and update the corresponding correlated records of the target instance while other database tables can utilize the target instance as the authoritative source during migration and update the corresponding correlated records of the source instance. In various embodiments, the migration policy allows a new target to initially override certain values of correlated data records at the source instance as part of the migration process. Once the migration process is complete, the directional correlation entries dictate the direction the data records are shared.

At 807, correlated data records are updated based on the determined migration policy. For example, using the migration policy determined at 805 and the determined authoritative source for each correlated data record, the newly correlated data records are updated. Depending on the migration policy, data records at the target and/or source instances are updated. In various embodiments, the updating can utilize the same or similar process and pipeline used when correlated data records are modified. For example, both outbound and inbound processing can be performed to create a modified version of each correlated data record that is appropriate for the designated receiving application instance. In some embodiments, the migration process may utilize customized inbound and outbound migration processing that is unique to the migration event and future updates to the correlated data records will revert to the configured inbound and outbound processing defined by the correlation configuration.

Figure 9:
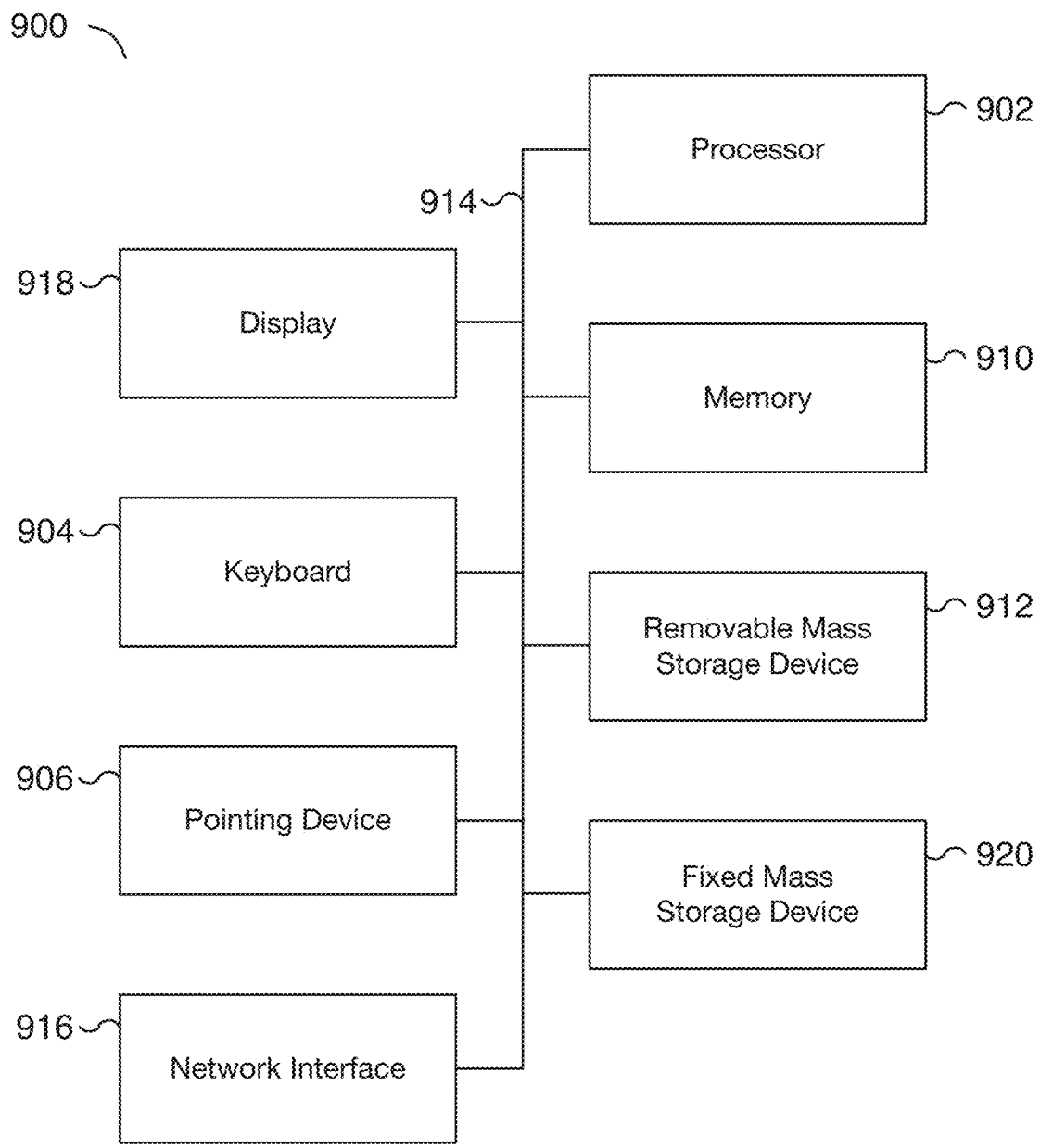
FIG. 9 is a functional diagram illustrating a programmed computer system for performing data record correlation and sharing.

FIG. 9 is a functional diagram illustrating a programmed computer system for performing data record correlation and sharing. As will be apparent, other computer system architectures and configurations can be utilized for order-preserving obfuscation of a protected dataset and/or performing comparison queries on the obfuscated data. Examples of computer system 900 include client 101, one or more computers of cloud service instances 111, 121, and 131 of FIG. 1, one or more computers of data stores 113, 123, and 133 of FIG. 1, and one or more computers of cloud service instance 201 of FIG. 2. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918). In various embodiments, one or more instances of computer system 900 can be used to implement at least portions of the processes of FIGS. 3-8.

Processor 902 is coupled bi-directionally with memory 910, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also as is well known in the art, primary storage typically includes basic operating instructions, program code, data and objects used by the processor 902 to perform its functions (e.g., programmed instructions). For example, memory 910 can include any suitable computer-readable storage media, described below, depending on whether, for example, data access needs to be bi-directional or unidirectional. For example, processor 902 can also directly and very rapidly retrieve and store frequently needed data in a cache memory (not shown).

A removable mass storage device 912 provides additional data storage capacity for the computer system 900, and is coupled either bi-directionally (read/write) or unidirectionally (read only) to processor 902. For example, storage 912 can also include computer-readable media such as magnetic tape, flash memory, PC-CARDS, portable mass storage devices, holographic storage devices, and other storage devices. A fixed mass storage 920 can also, for example, provide additional data storage capacity. The most common example of mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display monitor 918, a network interface 916, a keyboard 904, and a pointing device 906, as well as an auxiliary input/output device interface, a sound card, speakers, and other subsystems as needed. For example, the pointing device 906 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 9 is but an example of a computer system suitable for use with the various embodiments disclosed herein. Other computer systems suitable for such use can include additional or fewer subsystems. In addition, bus 914 is illustrative of any interconnection scheme serving to link the subsystems. Other computer architectures having different configurations of subsystems can also be utilized.

FIG. 10 is a diagram illustrating an embodiment of a user interface for viewing a correlation request. In the example shown, user interface 1000 is a user interface view of a user interface for reviewing a request for correlating and sharing a data record. In the example shown, the correlation request was approved by the user "System Administrator." The variables section of user interface 1000 includes details of the correlation request including a tenant instance name that corresponds to an application instance name for a cloud service instance. In various embodiments, user interface 1000 is displayed at a client accessing the correlation and sharing functionality of an application instance. In some embodiments, the client is client 101 of FIG. 1 and the application instance is one of cloud service instances 111, 121, and 131 of FIG. 1.

FIG. 11 is a diagram illustrating an embodiment of a user interface for displaying target instances associated with correlation requests. In the example shown, user interface 1100 is a user interface view of a user interface for viewing all correlation requests, including past and present requests, from different application instances to the source instance. In the example shown, each correlation request is associated with a "Request ID" and includes a "Status" value. The displayed "Status" values correspond to both "Active" and "Decommissioned" correlation requests. Other values for a correlation status are appropriate as well. For example, in some embodiments, that status value can correspond to "Requested" for a request pending approval and "Rejected" for a denied request. In the example shown, active requests are approved correlation requests that are actively providing the target instance with updates to correlated data records and decommissioned requests are approved requests that have been disabled and no longer update the associated target instance. In various embodiments, both active and decommissioned correlation requests and their corresponding correlation configurations can be migrated to another target instance. In various embodiments, user interface 1100 is displayed at a client accessing the correlation and sharing functionality of an application instance. In some embodiments, the client is client 101 of FIG. 1 and the application instance is one of cloud service instances 111, 121, and 131 of FIG. 1.

FIG. 12 is a diagram illustrating an embodiment of a user interface for displaying a correlation index used to capture portions of a correlation configuration. In the example shown, user interface 1200 is a user interface view of a user interface for viewing the correlation entries of a correlation index, where the correlation index of FIG. 12 corresponds to one embodiment of a correlation index used to represent correlation configurations for data records. In the example shown, each entry in the table corresponds to a directional correlation entry of a correlated data record and includes the following fields: an identifier for the correlation entry, an identifier for the correlated data record, an identifier for the table of the correlated data record, an identifier for the corresponding correlation entry stored at the target (i.e., remote) instance, a reference such as a host name of the target instance, a state of the correlation entry, and a domain associated with the correlation entry. Other fields not shown may exist as well. In various embodiments, the correlation entries shown with an "Active" state correspond to approved correlation requests that are actively providing the target instance with updates to the correlated data record. In various embodiments, user interface 1200 is displayed at a client accessing the correlation and sharing functionality of an application instance. In some embodiments, the client is client 101 of FIG. 1 and the application instance is one of cloud service instances 111, 121, and 131 of FIG. 1.

FIG. 13 is a diagram illustrating an embodiment of a user interface for configuring a capture event associated with sharing a correlated data record. In the example shown, user interface 1300 is a user interface view of a user interface for configuring the requirements that must be met for a correlated data record to be shared with a target instance. In the example shown, each capture event has a "Process Event" name, a state, and an order. In various embodiments, the process event name is used to assign inbound and outbound processing logic to the event, the state is used to enable or disable the event, and the order is used to prioritize the event against other events. Each capture event is also shown with a trigger portion and a capture portion. The trigger portion allows the user to define the capture event using a table name and multiple filters. The capture portion allows the user to define the table fields that should be captured and whether attachments should be included. In various embodiments, user interface 1300 is displayed at a client accessing the correlation and sharing functionality of an application instance. In some embodiments, the client is client 101 of FIG. 1 and the application instance is one of cloud service instances 111, 121, and 131 of FIG. 1.

FIG. 14 is a diagram illustrating an embodiment of a user interface for displaying outbound processing configurations associated with correlation requests. In the example shown, user interface 1400 is a user interface view of a user interface for displaying and configuring the outbound processing logic to perform when a capture event is detected. For example, when a correlated data record is modified and the modification meets the capture requirements, outbound processing is performed on the modified data record to create a version of the modified data record for sharing with the target instance. In various embodiments, the outbound processing logic is configured by bounding the outbound processing logic to a capture event of the correlated data record. In the example shown, the outbound processing configurations are shown based on their associated capture event; each capture event is shown with its process event name, the target (i.e., remote) instance associated with the correlation, the name assigned to the configured outbound processing logic (labeled as "Outbound Subflow"), and a domain. In various embodiments, user interface 1400 is displayed at a client accessing the correlation and sharing functionality of an application instance. In some embodiments, the client is client 101 of FIG. 1 and the application instance is one of cloud service instances 111, 121, and 131 of FIG. 1.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
  receiving, at a first application instance from a second application instance, a correlation request for a data record of the first application instance;
  updating a correlation index with a directional correlation entry in response to a determination that the correlation request is approved;
  in response to determining that the data record has been modified, utilizing the updated correlation index to determine that the modified data record is to be provided for correlation to the second application instance; and
  providing a version of the modified data record to the second application instance.

2. The method of claim 1, wherein the first application instance is hosted by a first server, the second application instance is hosted by a second server, and the first server and the second server are connected by a network.

3. The method of claim 1, wherein the determination that the correlation request is approved is based on an authorization from an administrator of the first application instance.

4. The method of claim 1, wherein the determination that the correlation request is approved is based on access permissions configured for the first application instance.

5. The method of claim 1, wherein the provided version of the modified data record includes a subset of data fields associated with the modified data record.

6. The method of claim 1, further comprising identifying that the second application instance is no longer reachable and disabling the directional correlation entry within the correlation index.

7. The method of claim 1, further comprising receiving, at the first application instance from a third application instance, a migration request.

8. The method of claim 7, further comprising modifying the directional correlation entry to reference the third application instance in response to a determination that the migration request is approved.

9. The method of claim 1, wherein the correlation request is associated with one or more trigger event requirements, and wherein the determination that the data record has been modified is based on the one or more trigger event requirements.

10. The method of claim 1, further comprising manipulating the modified data record to create the version of the modified data record to provide to the second application instance.

11. The method of claim 10, wherein manipulating the modified data record includes adding a new field.

12. The method of claim 1, wherein updating the correlation index with the directional correlation entry in response to the determination that the correlation request is approved includes storing a correlation identifier associated with the directional correlation entry and access credentials associated with the directional correlation entry and the second application instance.

13. A system comprising:
  one or more processors; and
  a memory coupled to the one or more processors, wherein the memory is configured to provide the one or more processors with instructions which when executed cause the one or more processors to:
    receive, at a first application instance from a second application instance, a correlation request for a data record of the first application instance;
    update a correlation index with a directional correlation entry in response to a determination that the correlation request is approved;
    in response to determining that the data record has been modified, utilize the updated correlation index to determine that the modified data record is to be provided for correlation to the second application instance; and provide a version of the modified data record to the second application instance.

14. The system of claim 13, wherein the determination that the correlation request is approved is based on an authorization from an administrator of the first application instance.

15. The system of claim 13, wherein the provided version of the modified data record includes a subset of data fields associated with the modified data record.

16. The system of claim 13, wherein the memory is further configured to provide the one or more processors with instructions which when executed cause the one or more processors to identify that the second application instance is no longer reachable and disable the directional correlation entry within the correlation index.

17. The system of claim 13, wherein the memory is further configured to provide the one or more processors with instructions which when executed cause the one or more processors to:
 receive, at the first application instance from a third application instance, a migration request; and
 modify the directional correlation entry to reference the third application instance in response to a determination that the migration request is approved.

18. The system of claim 13, wherein the memory is further configured to provide the one or more processors with instructions which when executed cause the one or more processors to manipulate the modified data record to create the version of the modified data record to provide to the second application instance.

19. The system of claim 18, wherein manipulating the modified data record includes adding a new field.

20. A computer program product, the computer program product being embodied in a non-transitory computer readable storage medium and comprising computer instructions for:
 receiving, at a first application instance from a second application instance, a correlation request for a data record of the first application instance;
 updating a correlation index with a directional correlation entry in response to a determination that the correlation request is approved;
 in response to determining that the data record has been modified, utilizing the updated correlation index to determine that the modified data record is to be provided for correlation to the second application instance; and
 providing a version of the modified data record to the second application instance.

\* \* \* \* \*